US012086258B1

(12) United States Patent
Righi et al.

(10) Patent No.: US 12,086,258 B1
(45) Date of Patent: Sep. 10, 2024

(54) FIRMWARE ATTESTATION ON SYSTEM RESET

(71) Applicant: AMERICAN MEGATRENDS INTERNATIONAL, LLC, Duluth, GA (US)

(72) Inventors: Stefano Righi, Lawrenceville, GA (US); Muthukkumaran Ramalingam, Duluth, GA (US); Joseprabu Inbaraj, Suwanee, GA (US); Madhan B. Santharam, Duluth, GA (US)

(73) Assignee: AMERICAN MEGATRENDS INTERNATIONAL, LLC, Duluth, GA (US)

( * ) Notice: Subject to any disclaimer, the term of this patent is extended or adjusted under 35 U.S.C. 154(b) by 315 days.

(21) Appl. No.: 17/561,575

(22) Filed: Dec. 23, 2021

(51) Int. Cl.
*G06F 21/50* (2013.01)
*G06F 9/54* (2006.01)
*G06F 21/57* (2013.01)

(52) U.S. Cl.
CPC .......... *G06F 21/572* (2013.01); *G06F 9/547* (2013.01); *G06F 21/577* (2013.01); *G06F 2221/034* (2013.01)

(58) Field of Classification Search
CPC ...... G06F 21/572; G06F 9/547; G06F 21/577; G06F 2221/034
See application file for complete search history.

(56) References Cited

U.S. PATENT DOCUMENTS

| | | | | |
|---|---|---|---|---|
| 10,489,142 B1 * | 11/2019 | Podgorsky | ............. | G06F 13/36 |
| 11,438,229 B2 * | 9/2022 | Ballard | .................... | H04L 49/20 |
| 11,531,760 B1 * | 12/2022 | Righi | ...................... | G06F 21/85 |
| 11,586,536 B1 * | 2/2023 | Jha | ....................... | G06F 21/6218 |
| 2017/0046152 A1 * | 2/2017 | Shih | .................... | G06F 11/0727 |
| 2017/0220802 A1 * | 8/2017 | Huang | .................. | G06F 9/4401 |
| 2019/0050351 A1 * | 2/2019 | Sahu | .................... | G06F 3/0604 |
| 2019/0114432 A1 * | 4/2019 | Tang | ...................... | G06F 21/81 |
| 2021/0103659 A1 * | 4/2021 | Ladkani | ................ | G06F 21/572 |
| 2022/0121749 A1 * | 4/2022 | Liu | ....................... | H04L 9/3239 |
| 2022/0398103 A1 * | 12/2022 | Maddukuri | ........... | G06F 9/4401 |
| 2022/0407714 A1 * | 12/2022 | Grobelny | ............. | H04L 9/0897 |

\* cited by examiner

*Primary Examiner* — Phy Anh T Vu
(74) *Attorney, Agent, or Firm* — Newport IP, LLC; Scott Y. Shigeta

(57) ABSTRACT

Technologies are described for performing firmware attestation on system reset. When a managed computing system is reset, a baseboard management controller ("BMC") generates a notification that the managed computing system has been reset and transmits the notification to an event listener executing in a management system by way of an out-of-band ("OOB") network. The event listener receives the notification that the managed computing system has been reset and, in turn, causes a security manager executing in the management system to transmit a request for firmware attestation data to a platform security agent executing on the managed computing system. The security manager receives the firmware attestation data from the platform security agent by way of an in-band network and stores the firmware attestation data in a database for exposure to other program components for use in evaluating the trustworthiness of the firmware executing on the managed computing system.

19 Claims, 8 Drawing Sheets

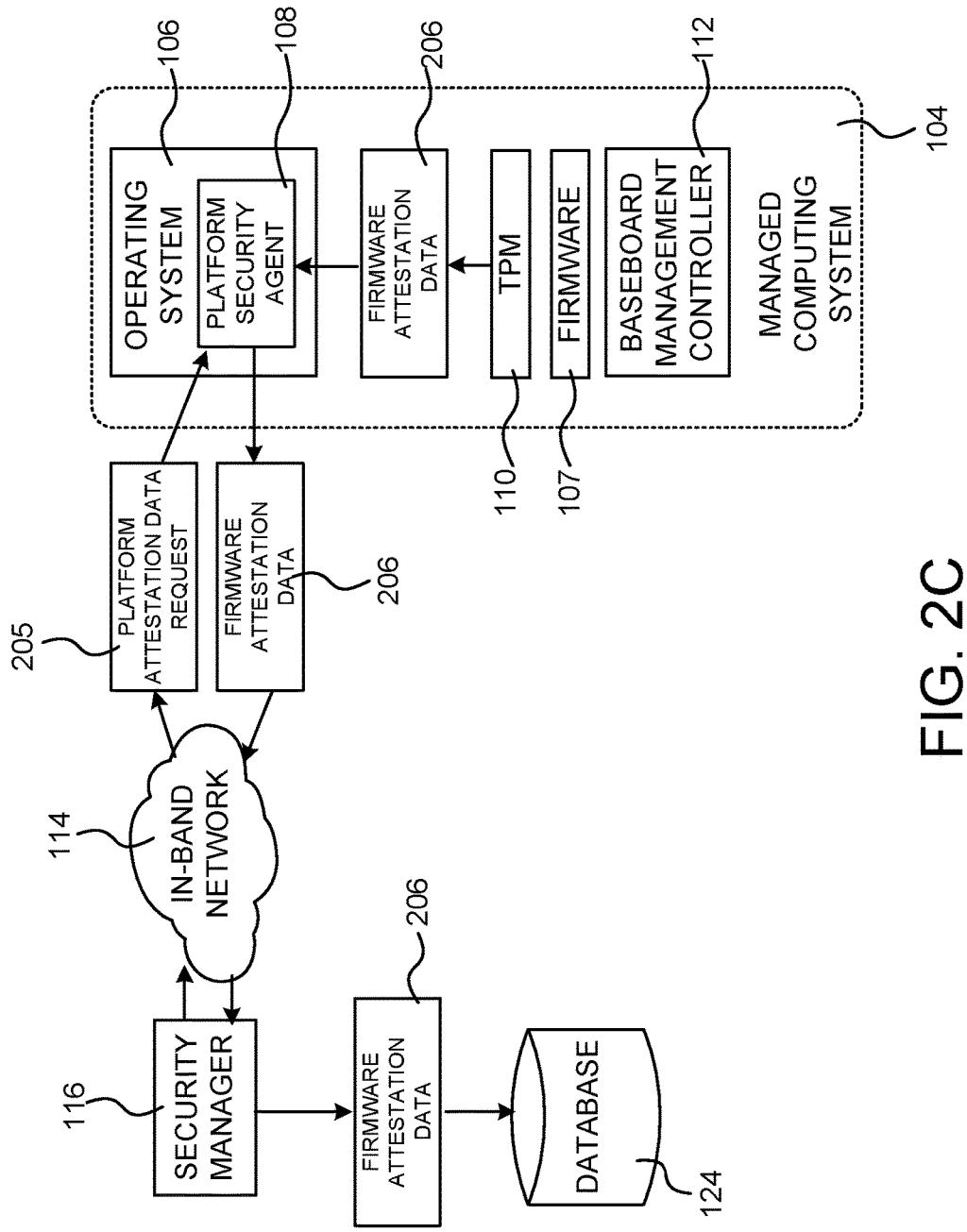

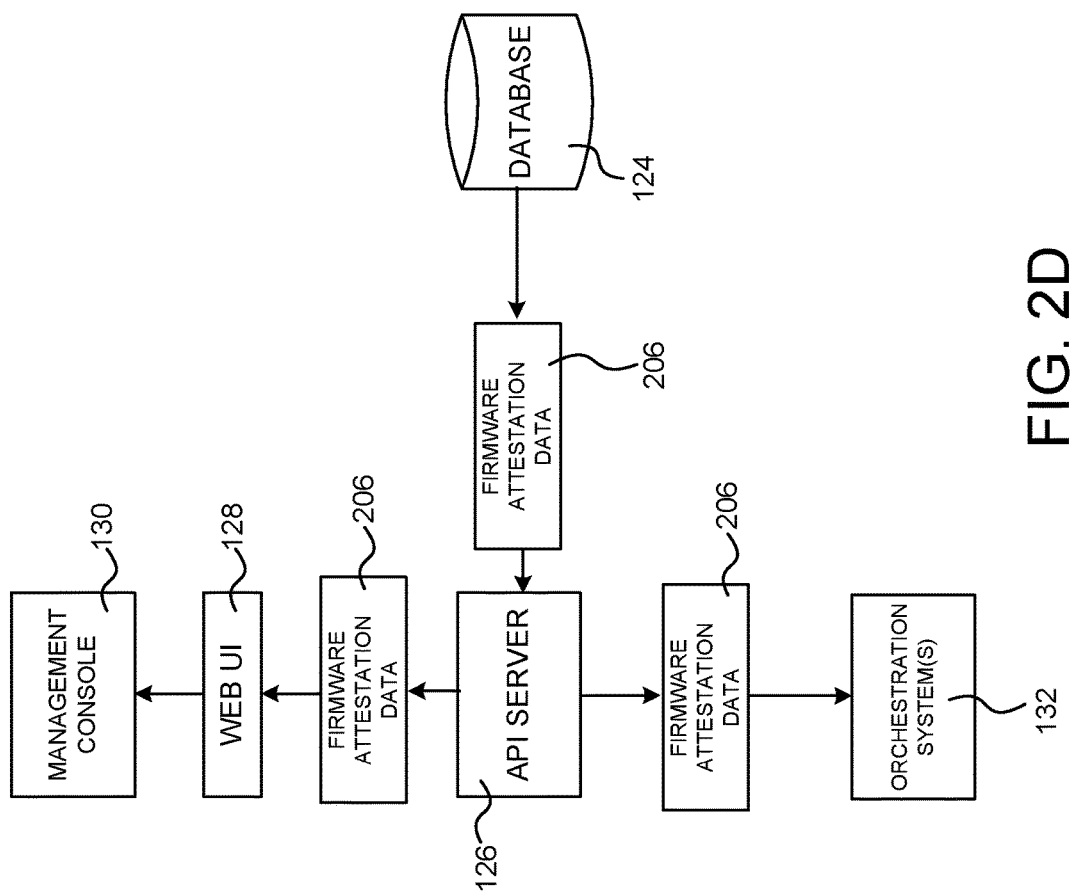

FIRMWARE ATTESTATION ON SYSTEM RESET

BACKGROUND

One of the major security threats for a server firmware is the possibility of tampering, thereby causing unwanted code to persist unnoticed in a server computing system (a "server computer" or simply "server"). To ensure the security of the firmware utilized by servers, it is therefore necessary to periodically validate the trustworthiness of the firmware to ensure that it has not been tampered with.

One mechanism for obtaining data from servers for use in verifying the trustworthiness of their firmware is to configure a management system to periodically poll the servers for data that can be utilized to validate the firmware utilized by the servers. However, polling server computers in this manner can utilize significant network bandwidth and other computing resources particularly in data centers and other installations with large numbers of servers. Additionally, when polling is utilized to obtain data from servers for use in validating the trustworthiness of their firmware, a server that has been compromised by an untrusted firmware will not be discovered until the next time the polling and validation of such data occurs. As a result, an untrusted firmware may take control of a server for the duration of the time between subsequent polls by the management system.

It is with respect to these and other considerations that the disclosure made herein is presented.

SUMMARY

Technologies are described herein for performing firmware attestation on system reset. Through implementations of the disclosed technologies, firmware attestation data that can be utilized to determine if a firmware of a managed computing system, such as a server computer, has been tampered with can be pulled from the managed computing system when the managed computing system is reset. The firmware attestation data can then be exposed to other components for use in verifying the trustworthiness of the firmware. Obtaining firmware attestation data in the disclosed manner eliminates the need for periodic polling of managed computing systems to obtain information to verify firmware trustworthiness and also eliminates the possibility that an untrusted firmware can execute during the time between polls for such information. Technical benefits other than those specifically mentioned herein can also be realized through an implementation of the disclosed technologies.

In order to achieve the technical benefits described above, and potentially others, an event listener executing in a management system is configured to subscribe for notifications that a managed computing system has been reset. As used herein, the term "reset" refers to a cold start (i.e. power on) or a warm start (i.e. restart) of the managed computing system. The notifications indicating that the managed computing system has been reset can be generated by a baseboard management controller ("BMC") located in the managed computing system. The notifications are transmitted from the BMC to the event listener on an out-of-band ("OOB") network in some embodiments.

When the managed computing system is reset, the BMC generates a notification that the managed computing system has been reset and transmits the notification to the event listener executing in the management system by way of the OOB network in some embodiments. The event listener receives the notification that the managed computing system has been reset and, in turn, causes a security manager executing in the management system to transmit a request for firmware attestation data to a platform security agent executing on the managed computing system. As will be discussed in greater detail below, the firmware attestation data can be utilized to determine whether the firmware of the managed computing device has been tampered with. The request is transmitted on an in-band network in some embodiments.

The security manager receives the firmware attestation data from the platform security agent by way of the in-band network and stores the firmware attestation data in a database in some embodiments. The firmware attestation data can then be exposed to other program components for use in evaluating the trustworthiness of the firmware executing on the managed computing system. For example, and without limitation, an application programming interface ("API") server might expose the firmware attestation data to a management console, one or more orchestration systems, or other types of components.

It should be appreciated that the above-described subject matter can also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of the technologies disclosed herein in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIGS. 2A-2D are system architecture diagrams illustrating additional aspects of the configuration and operation of the management system and the managed computing systems shown in FIG. 1 for performing firmware attestation on system reset according to one or more embodiments presented herein;

DETAILED DESCRIPTION

The following detailed description is directed to technologies for performing firmware attestation on system reset. As discussed briefly above, through implementations of the disclosed technologies, firmware attestation data that can be utilized to determine if a firmware of a managed computing system has been tampered with can be pulled from the managed computing system when the managed computing system is reset in a secure manner. Technical benefits other than those specifically mentioned herein can also be realized through an implementation of the disclosed technologies. Additional details regarding these aspects will be provided below with regard to FIGS. 1-5.

It is to be appreciated that the subject matter presented herein can be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations can be performed in combination with other types of program modules. Generally, program modules include routines, programs, components, data structures, and other types of structures that perform particular tasks or implement particular abstract data types.

Those skilled in the art will also appreciate that aspects of the subject matter described herein can be practiced on or in conjunction with other computer system configurations beyond those described herein, including multiprocessor systems, microprocessor-based or programmable consumer electronics, minicomputers, mainframe computers, handheld computers, personal digital assistants, e-readers, mobile telephone devices, tablet computing devices, special-purposed hardware devices, network appliances, and the like. The configurations described herein can be practiced in distributed computing environments, where tasks can be performed by remote computing devices that are linked through a communications network. In a distributed computing environment, program modules can be located in both local and remote memory storage devices.

In the following detailed description, references are made to the accompanying drawings that form a part hereof, and that show, by way of illustration, specific configurations or examples. The drawings herein are not drawn to scale. Like numerals represent like elements throughout the several figures (which might be referred to herein as a "FIG." or "FIGS.").

Figure 1:
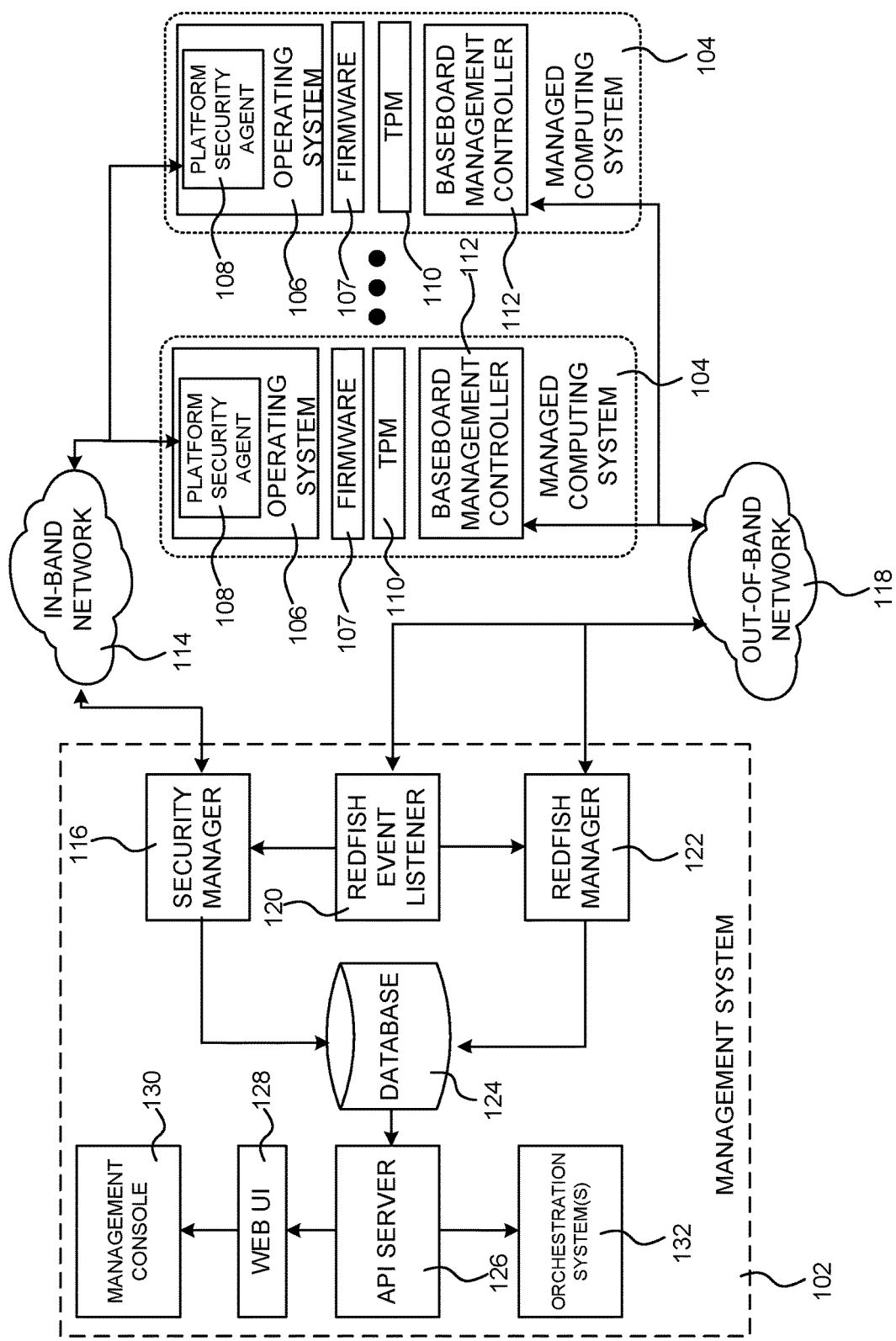
FIG. 1 is a system architecture diagram illustrating aspects of the configuration and operation of a management system and several managed computing systems for performing firmware attestation on system reset, according to one or more embodiments presented herein.

FIG. 1 is a system architecture diagram illustrating aspects of the configuration and operation of a management system 102 and several managed computing systems 104 configured for performing firmware attestation on system reset, according to one or more embodiments presented herein. As shown in FIG. 1 and described in greater detail below, the management system 102 provides functionality for managing various aspects of the operation of the managed computing systems 104. For example, and without limitation, the management system 102 can include various components configured for monitoring the performance, security, and other aspects of the operation of the managed computing systems 104. At least some of these components will be described in greater detail below.

In one embodiment, the managed computing systems 104 are server computers operating in a data center. The managed computing systems 104, however, can comprise other types of computing devices operating in other types of environments in other embodiments. Managed computing systems 104, such as that illustrated in FIG. 1, commonly include a baseboard management controller ("BMC") 112. A BMC 112 is a specialized service processor that monitors the physical state of a computer, network server, or other hardware device using sensors and communicates with a management system 102 through an out-of-band ("OOB") network connection 118.

The OOB network 118 is a communications network that is utilized for management purposes and is separate from the in-band network 114 utilized for production network traffic. Through the use of the OOB network 118 and a BMC 112, aspects of the operation of a managed computing system 104 can be monitored and controlled even when the managed computing system 104 is not reachable via the in-band network 114 or is powered off.

As a part of its operation, a BMC 112 can receive various types of management data from the managed computing systems 104. The management data can include, among other things, system inventory data that identifies the various components in the managed computing system 104. The BMC 112 can, in turn, provide the system inventory data to the management system 102 through the OOB network 118. In some embodiments, the management data and the other data described herein as being transmitted by the BMC 112 can be formatted in a REDFISH-compatible JavaScript Object Notation ("JSON") format based on an Open Data Protocol ("OData").

As known to those skilled in the art, REDFISH is a successor to previous manageability interfaces created by the Desktop Management Taskforce ("DMTF"). REDFISH is an open industry standard specification and schema for simple, modern, and secure management of scalable platform hardware, such as server computers located in data centers. The REDFISH specification and schema specifies a Representational State Transfer ("REST") interface and utilizes JSON and OData to integrate management solutions within existing toolchains.

The managed computing systems 104 can also be provisioned with a platform security agent 108 that executes on an operating system 106 executing on the managed computing systems 104. As will be described in greater detail below, the platform security agent 108 provides functionality for in-band communication between the managed computing systems 104 and the management system 102 via the in-band network 114. Additional details regarding this communication will be provided below with regard to FIGS. 2A-3.

As shown in FIG. 1, the managed computing systems 104 can also include a firmware 107. The firmware 107 typically provides functionality for booting the managed computing devices 104. The firmware 107 might also include functionality for providing an interface to the platform hardware to an operating system 106 or application programs executing on the operating system 106. The firmware 107 might also provide other types of functionality. Examples of the firmware 107 include, but are not limited to, a PC-compatible basic input/output system ("BIOS") and a firmware compatible with the Unified Extensible Firmware Interface ("UEFI") Specification. Other types of firmware 104 might also be utilized in other embodiments. Details regarding the configuration an operation of a UEFI Specification-compliant firmware 107 are provided below with regard to FIG. 4.

The managed computing systems 104 also include a trusted platform module ("TPM") 110 or another type of hardware trust evaluation module in some embodiments. Generally, the TPM 110 offers facilities for the secure generation of cryptographic keys, and limitation of their use, in addition to a hardware true random number generator. The TPM 110 can also include capabilities such as remote attestation, binding, and sealed storage.

Remote attestation creates a nearly unforgeable hash-key summary of a hardware and software configuration. A program encrypting data determines the extent of the summary of the software. This allows a third party to verify that the software has not been changed. Binding encrypts data using a TPM endorsement key, which is a unique RSA key burned into the TPM 110 during its production, or another trusted key descended from it. Sealing encrypts data in similar manner to binding, but in addition specifies a state in which the TPM 110 must be in order for the data to be decrypted (unsealed). Additionally, the TPM 110 can be used to authenticate hardware devices and to verify the integrity of software.

It should be appreciated that while a TPM 10 is utilized in embodiments as a hardware trust evaluation device, other types of hardware trust evaluation devices can be utilized in other configurations. Additional details regarding the operation of the TPM 110 in the embodiments disclosed herein will be provided below.

As discussed briefly above, one of the major security threats for a server is the possibility of tampering with the firmware utilized by the server. To ensure the security of the firmware 107 of a managed computing system 104, it is therefore necessary to periodically validate the trustworthiness of the firmware 107 to ensure that it has not been tampered with.

As also discussed briefly above, one mechanism for obtaining data from servers such as the managed computing systems 104 for use in verifying the trustworthiness of their firmware is to configure a management system to periodically poll the servers for data that can be utilized to validate the firmware utilized by the servers. However, polling server computers in this manner can utilize significant network bandwidth and other computing resources particularly in data centers and other installations with large numbers of servers. Additionally, when polling is utilized to obtain data from servers for use in validating the trustworthiness of their firmware, a server that has been compromised by an untrusted firmware will not be discovered until the next time the polling and validation of such data occurs. As a result, an untrusted firmware may take control of a server for the duration of the time between subsequent polls by the management system. It is with respect to these and other considerations that the disclosure made herein is presented.

In order to address the technical challenges described above, and potentially others, firmware attestation data that can be utilized to determine if a firmware 107 of a managed computing system 104 has been tampered with can be pulled from the managed computing system 104 when the managed computing system 104 is reset in a secure manner. The firmware attestation data can then be exposed to other components for use in verifying the trustworthiness of the firmware 107. Obtaining firmware attestation data in the disclosed manner eliminates the need for periodic polling of managed computing systems to obtain information to verify firmware trustworthiness and also eliminates the possibility that an untrusted firmware can execute during the time between polls for such information. Technical benefits other than those specifically mentioned herein can also be realized through an implementation of the disclosed technologies.

In order to achieve the technical benefits described above, and potentially others, an event listener 120 executing in the management system 102 is configured to subscribe to receive an event notification when a managed computing system 104 has been reset. As mentioned above, the term "reset" as used herein refers to a cold start (i.e. power on) or a warm start (i.e. restart) of the managed computing system 104. Additional details regarding this aspect will be provided below with regard to FIG. 2A.

The notifications indicating that the managed computing system 104 has been reset can be generated by a BMC 112 located in the managed computing system 104. The event notifications can be transmitted from the BMC 112 to the event listener 120 on the OOB network 118 in some embodiments. In some configurations, the BMC 112 and the event listener 120 are compatible with the REDFISH standard described above. In these embodiments, the event listener 120 registers with the BMC 112 for REDFISH event notifications. Accordingly, the event listener 120 might be referred to herein as the "REDFISH event listener 120."

When a managed computing system 104 is reset, the BMC 112 generates a REDFISH event notification indicating that the managed computing system 104 has been reset and transmits the notification to the REDFISH event listener 120 executing in the management system 102 by way of the OOB network 118 in some embodiments. The REDFISH event notification can also be provided to a REDFISH manager 122 executing in the management system. Additional details regarding this process are provided below with regard to FIG. 2B.

The REDFISH event listener 120 receives the notification that the managed computing system 104 has been reset and, in turn, causes a security manager 116 executing in the management system 102 to transmit a request for firmware attestation data to the platform security agent 108 executing on the managed computing system 104 that has been reset. As will be discussed in greater detail below, the firmware attestation data can be utilized to determine whether the firmware 107 of the managed computing system 104 that has been reset has been tampered with.

The request from the security manager 116 to the platform security agent 108 is transmitted on the in-band network 114 in some embodiments. The security manager 116 receives the firmware attestation data from the platform security agent 108 by way of the in-band network 114 and stores the firmware attestation data in a database 124 in some embodiments. Additional details regarding this process are provided below with regard to FIG. 2C.

The firmware attestation data can then be exposed to other program components for use in evaluating the trustworthiness of the firmware 107 executing on the managed computing system 104 that was reset. For example, and without limitation, an application programming interface ("API") server 126 might expose the firmware attestation data to a management console 130 configured to provide a web user interface 128, one or more orchestration systems 132, or other types of components. Additional details regarding this aspect will be provided below with regard to FIG. 2D.

It is to be appreciated that FIG. 1 has been simplified to provide a high level overview of the technologies disclosed herein, and that many other software and hardware components can be utilized to implement the functionality disclosed herein. For example, and without limitation, other networking components can be utilized to connect the management system 120 to the managed computing systems 104. In this regard, it is also to be appreciated that while only two managed computing systems 104 have been illustrated in FIG. 1, many such computing systems can be utilized in various configurations.

Figure 2A:
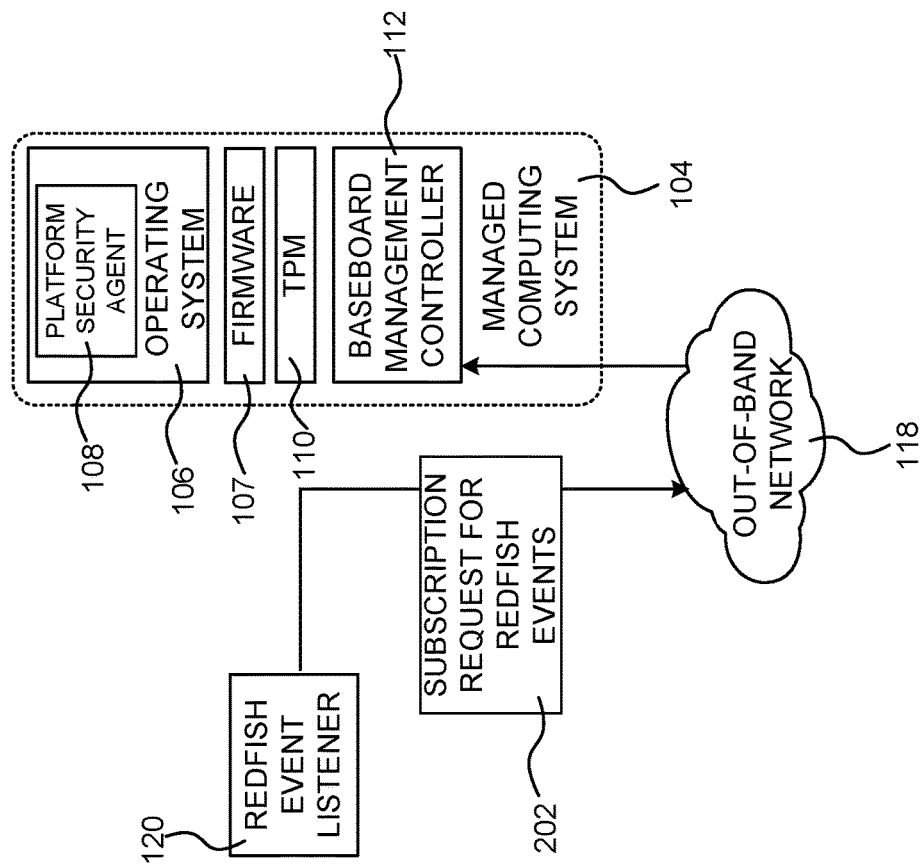

FIGS. 2A-2D are system architecture diagrams illustrating additional aspects of the configuration and operation of the management system 102 and the managed computing systems 104 shown in FIG. 1 for performing firmware attestation on system reset according to one or more embodiments presented herein. In particular, FIG. 2A illustrates aspects of one mechanism disclosed herein for enabling a REDFISH event listener 120 in the management system 102 to register to receive notifications that a managed computing system 104 has been reset.

As shown in FIG. 2A, the REDFISH event listener 120 can transmit a subscription request 202 for REDFISH events to the BMC 112 by way of the OOB network 118. In response to the receiving the request 202, the BMC 112 configures itself to provide a notification to the REDFISH event listener 120 each time the managed computing system 104 is reset. As mentioned above, the term "reset" as used herein refers to a cold start (i.e. power on) or a warm start (i.e. restart) of the managed computing system 104.

Figure 2B:
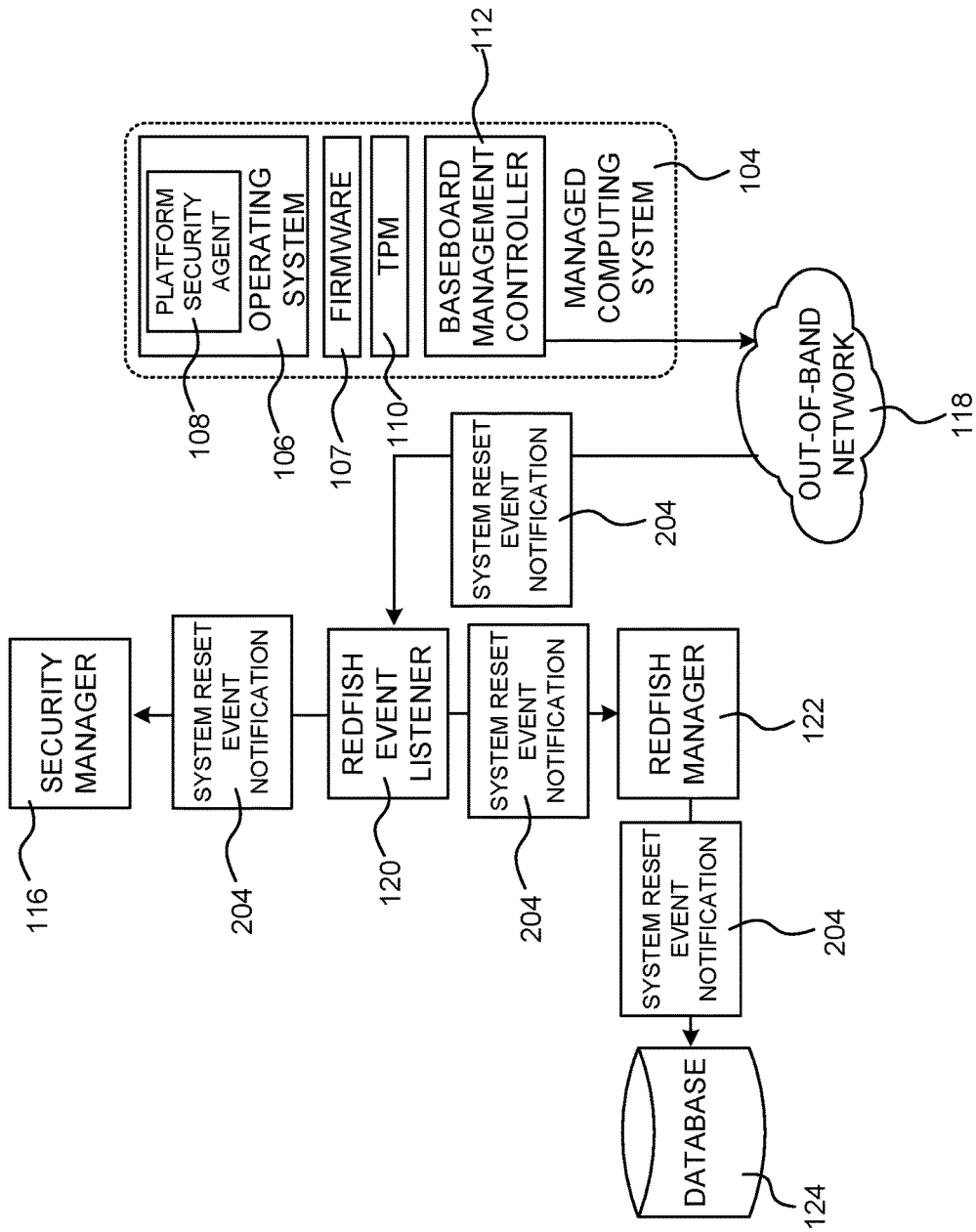

As illustrated in FIG. 2B and described briefly above, when a managed computing system 104 is reset, the BMC 112 of the managed computing system 104 generates a REDFISH event notification 204 (which might also be referred to herein as a "system reset event notification") indicating that the managed computing system 104 has been reset and transmits the notification to the REDFISH event listener 120 executing in the management system 102 by way of the OOB network 118 in some embodiments.

In turn, the REDFISH event listener 120 provides the REDFISH event notification 204 to the security manager 116. As will be discussed in greater detail below with regard to FIG. 2C, the security manager 116 requests firmware attestation data 206 from the reset managed computing system 104 in response to receiving the REDFISH event notification 204. Additionally, the REDFISH event listener 120 may also provide the REDFISH event notification 204 to the REDFISH manager 122, also executing in the management system 102. The REDFISH manager 122 stores the REDFISH event notification 204 in a database 124 accessible to other components in the management system 102, some of which are described below with regard to FIG. 2D.

As discussed briefly above, when a managed computing system 104 is reset, the BMC 112 generates a REDFISH event notification 204 indicating that the managed computing system 104 has been reset and transmits the notification to the REDFISH event listener 120 executing in the management system 102 by way of the OOB network 118 in some embodiments. As shown in FIGS. 2B and 2C, the REDFISH event listener 120 receives the notification 204 that the managed computing system 104 has been reset and, in turn, causes the security manager 116 executing in the management system 102 to transmit a request 205 for firmware attestation data 206 to the platform security agent 108 executing on the managed computing system 104 that has been reset.

The firmware attestation data 206 is generated by the TPM 110 on reset and can be utilized to determine whether the firmware 107 of the managed computing system 104 that has been reset has been tampered with. In particular, the firmware attestation data 206 comprises one or more platform configuration registers ("PCRs") maintained by the TPM 110 in one embodiment. Other types of data that can be utilized to attest to the integrity of the firmware 107 can be provided in other embodiments.

The request from the security manager 116 to the platform security agent 108 is transmitted on the in-band network 114 in some embodiments. The security manager 116 receives the firmware attestation data 206 from the platform security agent 108 by way of the in-band network 114 and stores the firmware attestation data in a database 124 in some embodiments.

As described briefly above and illustrated in FIG. 2D, the firmware attestation data 206 can then be exposed to other program components for use in evaluating the trustworthiness of the firmware 107 executing on the managed computing system 104 that was reset. For example, and without limitation, an API server 126 executing in the management system 102 might expose the firmware attestation data 206 to a management console 130 configured to provide a web user interface 128 for viewing and interacting with the firmware attestation data 206.

As also illustrated in FIG. 2D, the API server 126 can also provide APIs through which one or more orchestration systems 132 can access the firmware attestation data 206 to determine the integrity of the firmware 107. Examples of such systems include, but are not limited to, KUBERNETES and OPENSTACK. The APIs exposed by the API server 126 are implemented as JSON RESTful APIs in some embodiments.

Figure 3:
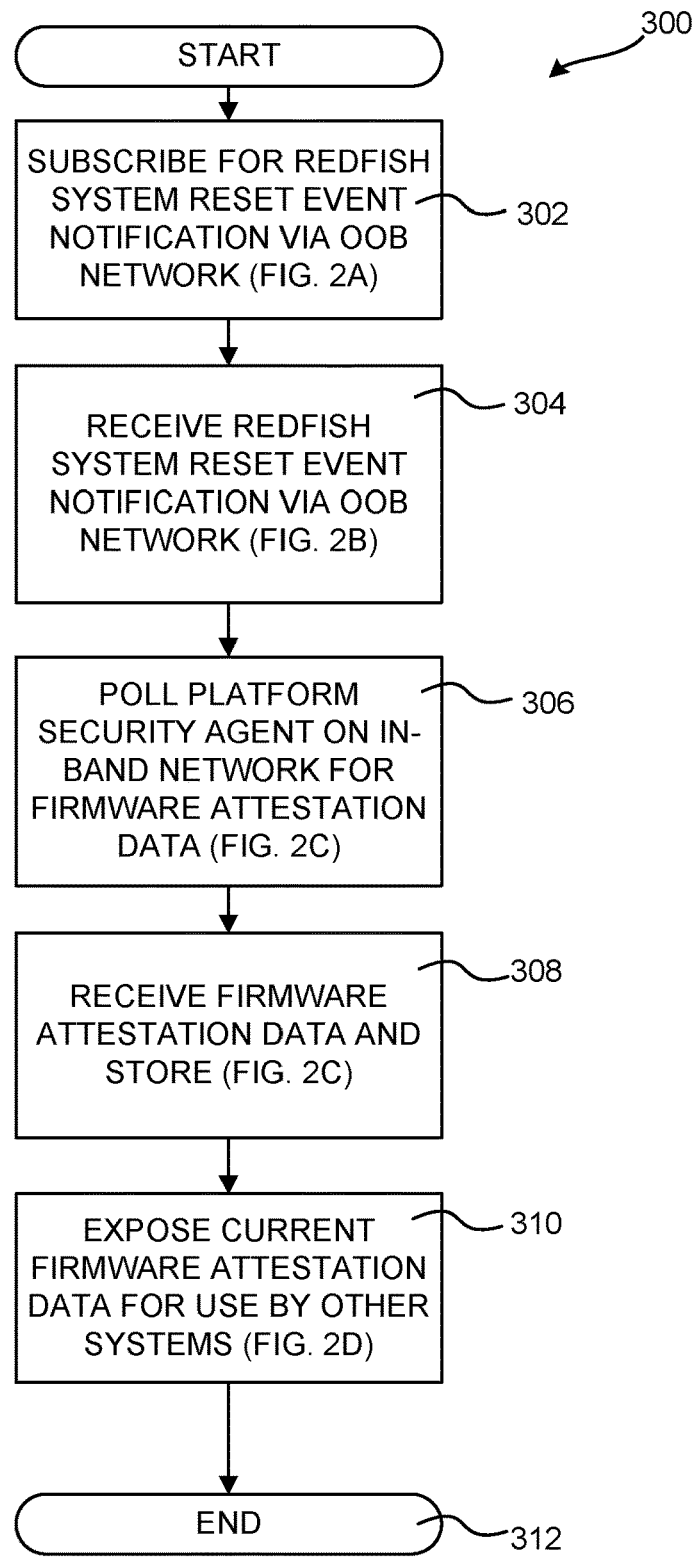
FIG. 3 is a flow diagram showing routines that illustrate aspects of the operation of the components shown in FIGS. 1 and 2A-2D for firmware attestation on system reset, according to one embodiment presented herein.

FIG. 3 is a flow diagram showing routines that illustrate aspects of the operation of the components shown in FIGS. 1 and 2A-2D for firmware attestation on system reset, according to one embodiment presented herein. It is to be appreciated that the logical operations described herein with respect to FIG. 3, and the other FIGS., can be implemented (1) as a sequence of computer implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. and described herein. These operations can also be performed in parallel, or in a different order than those described herein. These operations can also be performed by components other than those specifically identified.

The routine 300 begins at operation 302, where the REDFISH event listener 120 subscribes for a REDFISH event notification 204 via the OOB network 118 in the manner described above. The routine 300 then proceeds from operation 302 to operation 304, where the managed computing device 104 is reset and, in turn, a REDFISH event notification 204 is transmitted from the BMC 112 to the REDFISH event listener 120.

From operation 304, the routine 300 proceeds to operation 306, where the security manager 116 polls the managed computing system 104 for the firmware attestation data 206. The security manager 116 receives the firmware attestation data 206 at operation 308 and stores the firmware attestation data 206 in the database 124. The routine 300 then proceeds from operation 308 to operation 310, where the firmware attestation data 206 is exposed for use by other systems such as the orchestration systems 132 by way of the API server 126. The firmware attestation data 206 can then be utilized to verify the trustworthiness of the firmware 107 by verifying the received data against known good values. The routine 300 then proceeds from operation 310 to operation 312, where it ends.

In view of the above, it should be appreciated that the technologies described herein provide increased security for a firmware 107. In particular, because the firmware 107 is used only at restart time, a compromised firmware will not be used until the next restart. Therefore, if a firmware is compromised but it is identified as such at the next restart as disclosed herein, no harm has occurred to the system during the time the firmware 108 was compromised and the next reboot when the compromised code will be used. In this regard, it is to be further appreciated that mechanisms can be utilized to ensure that a compromised firmware cannot masquerade as an uncompromised firmware. In particular, in one embodiment an attestation mechanism is utilized where a nonce is transmitted to the TPM 110 that is added to the firmware attestation data 206 before the TPM 110 signs the firmware attestation data 206.

It is to be further appreciated that an alternative way to achieve similar results is to increase the polling time described above. However, this can utilize significant resources and may not achieve the same level of security. Therefore, the mechanism described above is both an optimization and provides a higher level of security. As such, while some level of polling is required, an attacker who would be able to undermine the notification system disclosed herein might be undetected for a very long time. A mitigation of such potential vulnerability can be achieved by utilizing polling as described herein, but without the frequent rate required to mitigate without the utilization of the disclosed notification system.

Figure 4:
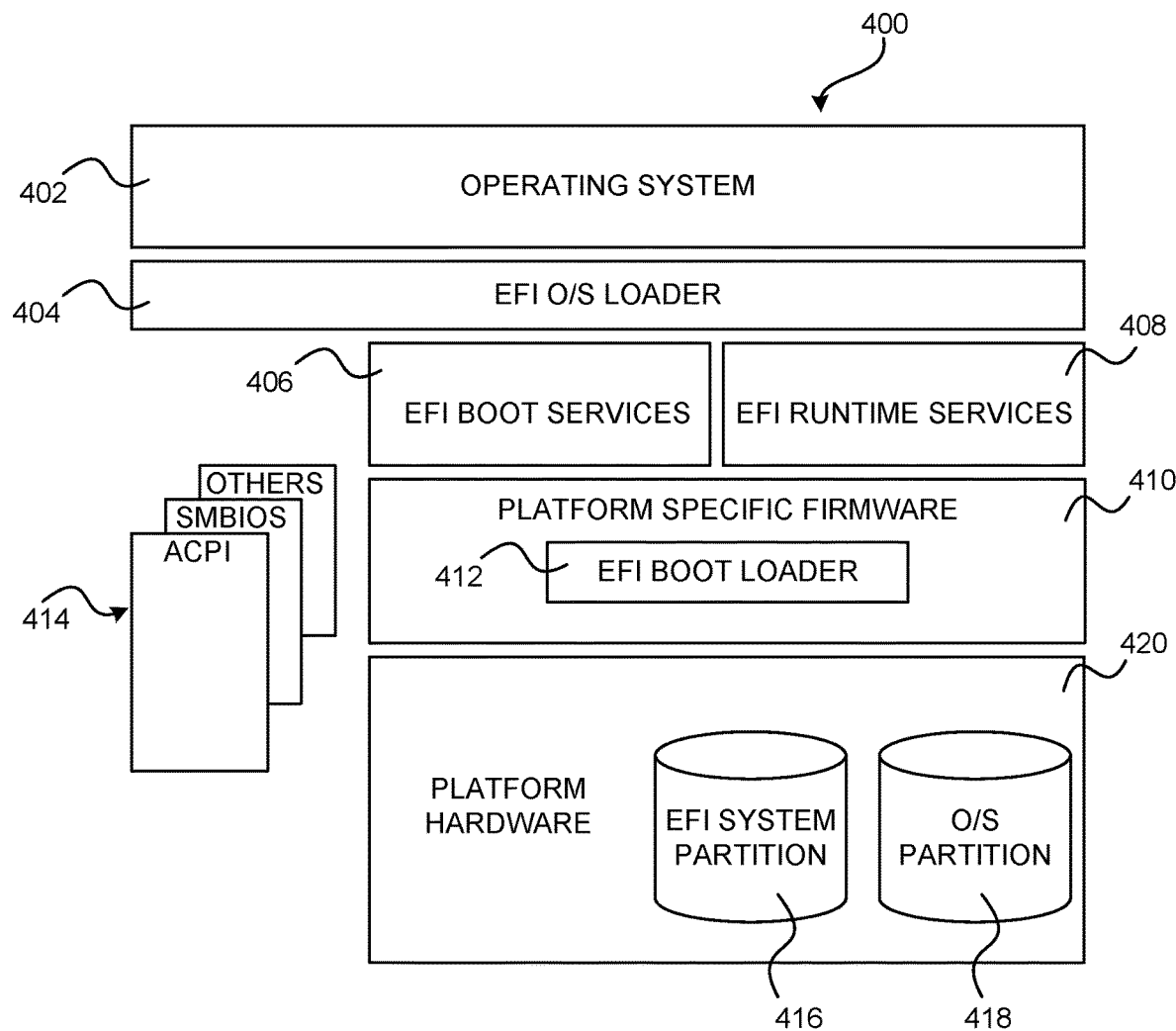
FIG. 4 is a software architecture diagram illustrating a software architecture for a unified extensible firmware interface ("UEFI")-compliant firmware that provides an operating environment for aspects of the technologies presented herein in one embodiment.

Turning now to FIG. 4, a software architecture diagram will be described that illustrates an architecture for a Unified Extensible Firmware Interface ("UEFI") Specification-compliant firmware 400 that can be configured to provide and/or utilize aspects of the technologies disclosed herein. In particular, the firmware architecture shown in FIG. 4 can be utilized to implement the firmware 107 described above. The firmware 107 can also be implemented in other ways in other configurations.

The UEFI Specification describes an interface between an operating system 402 and a UEFI Specification-compliant firmware 400. The UEFI Specification also defines an interface that a firmware 400 can implement, and an interface that an operating system 402 (which might be referred to herein as an "OS") can use while booting. How a firmware implements the interface can be left up to the manufacturer of the firmware. The UEFI Specification also defines a way for an operating system 402 and a firmware 400 to exchange information necessary to support the operating system boot process. The term "UEFI Specification" used herein refers to both the EFI Specification developed by INTEL CORPORATION and the UEFI Specification managed by the UEFI FORUM.

As shown in FIG. 4, the architecture can include platform hardware 420, such as that described below with regard to FIG. 5, and an operating system 402. A boot loader 412 for the operating system 402 can be retrieved from the UEFI system partition 416 using a UEFI operating system loader 404. The UEFI system partition 416 can be an architecturally shareable system partition. As such, the UEFI system partition 416 can define a partition and file system designed to support safe sharing of mass storage between multiple vendors. An OS partition 418 can also be utilized.

Once started, the UEFI OS loader 404 can continue to boot the complete operating system 402. In doing so, the UEFI OS loader 404 can use UEFI boot services 406, an interface to other supported specifications, to survey, comprehend, and initialize the various platform components and the operating system software that manages them. Thus, interfaces 414 from other specifications can also be present on the system. For example, the ACPI and the System Management BIOS ("SMBIOS") specifications can be supported.

UEFI boot services 406 can provide interfaces for devices and system functionality used during boot time. UEFI runtime services 408 can also be available to the UEFI OS loader 404 during the boot phase. UEFI allows extension of platform firmware by loading UEFI driver and UEFI application images which, when loaded, have access to UEFI-defined runtime and boot services.

Additional details regarding the operation and architecture of a UEFI Specification-compliant firmware can be found in the UEFI Specification which is available from the UEFI Forum. INTEL CORPORATION has also provided further details regarding recommended implementation of EFI and UEFI in the form of The INTEL Platform Innovation Framework for EFI ("the Framework"). Unlike the UEFI Specification, which focuses on programmatic interfaces for the interactions between the operating system 402 and system firmware 400, the Framework is a group of specifications that together describe a firmware implementation that has been designed to perform the full range of operations that are required to initialize a platform from power on through transfer of control to the operating system 402. The specifications that make up the Framework, which are also available from INTEL CORPORATION, are also expressly incorporated herein by reference.

Figure 5:
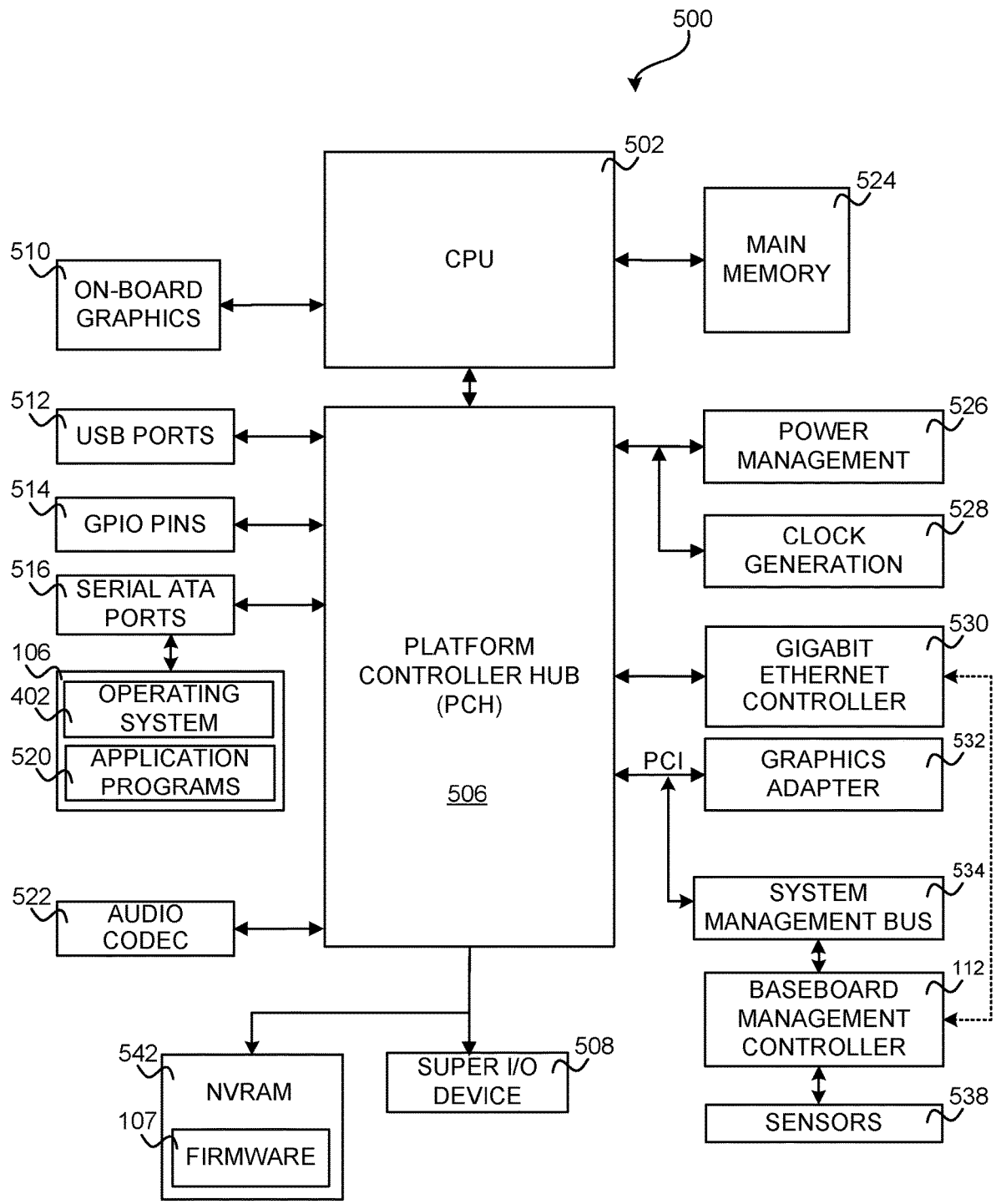
FIG. 5 is a computer architecture diagram that shows an illustrative architecture for a computer that can implement the technologies disclosed herein.

Referring now to FIG. 5, a computer architecture diagram that shows an illustrative architecture for a computer that can provide an operating environment for the technologies presented herein will be described. For example, and without limitation, the computer architecture shown in FIG. 5 can be utilized to implement a managed computing system 104, computing systems within the management system 102, and/or any of the other computing systems disclosed herein.

FIG. 5 and the following discussion are intended to provide a brief, general description of a suitable computing environment in which the configurations described herein can be implemented. While the technical details are presented herein in the general context of program modules that execute in conjunction with the execution of an operating system, those skilled in the art will recognize that the configurations can also be implemented in combination with other program modules.

Generally, program modules include routines, programs, components, data structures, and other types of structures that perform particular tasks or implement particular abstract data types. Moreover, those skilled in the art will appreciate that the configurations described herein can be practiced with other computer system configurations, including handheld devices, multiprocessor systems, microprocessor-based or programmable consumer electronics, minicomputers, mainframe computers, and the like. The configurations described herein can also be practiced in distributed computing environments where tasks are performed by remote processing devices that are linked through a communications network. In a distributed computing environment, program modules can be located in both local and remote memory storage devices.

In particular, FIG. 5 shows an illustrative computer architecture for a computer 500 that can be utilized in the implementations described herein. The computer 500 includes a baseboard, or "motherboard", which is a printed circuit board to which a multitude of components or devices can be connected by way of a system bus or other electrical communication path. In one illustrative configuration, a central processing unit ("CPU") 502 operates in conjunction with a Platform Controller Hub ("PCH") 506. The CPU 502 is a central processor that performs arithmetic and logical operations necessary for the operation of the computer 500. The computer 500 can include a multitude of CPUs 502. Each CPU 502 might include multiple processing cores.

The CPU 502 provides an interface to a random access memory ("RAM") used as the main memory 524 in the computer 500 and, possibly, to an on-board graphics adapter 510. The PCH 506 provides an interface between the CPU 502 and the remainder of the computer 500.

The PCH 506 can also be responsible for controlling many of the input/output functions of the computer 500. In particular, the PCH 506 can provide one or more universal serial bus ("USB") ports 512, an audio codec 522, a Gigabit Ethernet Controller 532, and one or more general purpose input/output ("GPIO") pins 514. The USB ports 512 can include USB 2.0 ports, USB 3.0 ports and USB 3.1 ports among other USB ports. The audio codec 522 can include Intel High Definition Audio, Audio Codec '97 ("AC'97") and Dolby TrueHD among others.

The PCH 506 can also include functionality for providing networking functionality through a Gigabit Ethernet Controller 530. The Gigabit Ethernet Controller 530 is capable of connecting the computer 500 to another computer via a network. Connections which can be made by the Gigabit Ethernet Controller 530 can include LAN or WAN connections. LAN and WAN networking environments are commonplace in offices, enterprise-wide computer networks, intranets, and the Internet.

The PCH 506 can also provide a bus for interfacing peripheral card devices such as a graphics adapter 532. In one configuration, the bus comprises a PCI bus. The PCI bus can include a Peripheral Component Interconnect ("PCI") bus, a Peripheral Component Interconnect extended ("PCI-X") bus and a Peripheral Component Interconnect Express ("PCIe") bus among others.

The PCH 506 can also provide a system management bus 534 for use in managing the various components of the computer 500. Additional details regarding the operation of the system management bus 534 and its connected components are provided below. Power management circuitry 526 and clock generation circuitry 528 can also be utilized during the operation of the PCH 506.

The PCH 506 is also configured to provide one or more interfaces for connecting mass storage devices to the computer 500. For instance, according to one configuration, the PCH 506 includes a serial advanced technology attachment ("SATA") adapter for providing one or more serial ATA ports 516. The serial ATA ports 516 can be connected to one or more mass storage devices storing an OS, such as OS 402 and application programs 520, such as a SATA disk drive 518. As known to those skilled in the art, an OS 402 comprises a set of programs that control operations of a computer and allocation of resources. An application program is software that runs on top of the operating system 402, or other runtime environment, and uses computer resources to perform application specific tasks desired by the user.

According to one configuration, the OS 402 comprises the LINUX operating system. According to another configuration, the OS 402 comprises the WINDOWS operating system from MICROSOFT CORPORATION. According to another configuration, the OS 402 comprises the UNIX operating system or one of its variants. It should be appreciated that other operating systems can also be utilized.

The mass storage devices connected to the PCH 506, and their associated computer-readable storage media, provide non-volatile storage for the computer 500. Although the description of computer-readable storage media contained herein refers to a mass storage device, such as a hard disk or CD-ROM drive, it should be appreciated by those skilled in the art that computer-readable storage media can be any available media that can be accessed by the computer 500.

By way of example, and not limitation, computer-readable storage media can comprise computer storage media and communication media. Computer storage media includes volatile and non-volatile, removable and non-removable media implemented in any method or technology for storage of information such as computer-readable instructions, data structures, program modules or other data. However, computer-readable storage media does not encompass transitory signals.

Computer storage media includes, but is not limited to, RAM, ROM, EPROM, EEPROM, flash memory or other solid state memory technology, CD-ROM, DVD, HD-DVD, BLU-RAY, or other optical storage, magnetic cassettes, magnetic tape, magnetic disk storage or other magnetic storage devices, or any other medium which can be used to store the desired information, and which can be accessed by the computer 500.

A low pin count ("LPC") interface can also be provided by the PCH 506 for connecting a Super I/O device 508. The Super I/O device 508 is responsible for providing a number of input/output ports, including a keyboard port, a mouse port, a serial interface, a parallel port, and other types of input/output ports. The LPC interface can also connect a computer storage media such as a ROM or a flash memory such as a NVRAM 542 for storing firmware 107 that includes program code containing the basic routines that help to start up the computer 500 and to transfer information between elements within the computer 500 as discussed above with regard to FIG. 4.

It should be appreciated that the program modules disclosed herein, including the firmware 107, can include software instructions that, when loaded into the CPU 502 and executed, transform a general-purpose computer 500 into a special-purpose computer 500 customized to facilitate all, or part of, the operations disclosed herein. As detailed throughout this description, the program modules can provide various tools or techniques by which the computer 500 can participate within the overall systems or operating environments using the components, logic flows, and/or data structures discussed herein.

The CPU 502 can be constructed from any number of transistors or other circuit elements, which can individually or collectively assume any number of states. More specifically, the CPU 502 can operate as a state machine or finite-state machine. Such a machine can be transformed to a second machine, or a specific machine, by loading executable instructions contained within the program modules. These computer-executable instructions can transform the CPU 502 by specifying how the CPU 502 transitions between states, thereby transforming the transistors or other circuit elements constituting the CPU 502 from a first machine to a second machine, wherein the second machine can be specifically configured to perform the operations disclosed herein. The states of either machine can also be transformed by receiving input from one or more user input devices, network interfaces (such as the Gigabit Ethernet Controller 530), other peripherals, other interfaces, or one or more users or other actors. Either machine can also transform states, or various physical characteristics of various output devices such as printers, speakers, video displays, or otherwise.

Encoding the program modules can also transform the physical structure of the storage media. The specific transformation of physical structure can depend on various factors, in different implementations of this description. Examples of such factors can include but are not limited to the technology used to implement the storage media, whether the storage media are characterized as primary or secondary storage, and the like. For example, if the storage media are implemented as semiconductor-based memory, the program modules can transform the physical state of the semiconductor main memory 524 and/or NVRAM 504. For example, the software can transform the state of transistors, capacitors, or other discrete circuit elements constituting the semiconductor memory.

As another example, the storage media can be implemented using magnetic or optical technology such as hard drives or optical drives. In such implementations, the program modules can transform the physical state of magnetic or optical media, when the software is encoded therein. These transformations can include altering the magnetic characteristics of particular locations within given magnetic media. These transformations can also include altering the physical features or characteristics of particular locations within given optical media to change the optical characteristics of those locations. It should be appreciated that various other transformations of physical media are possible without departing from the scope and spirit of the present description.

As described above, the PCH 506 can include a system management bus 534. As discussed above, when utilized to implement a managed computing system 104, the system management bus 534 can include a BMC 112. As discussed above, the BMC 112 is a microcontroller that monitors operation of the computer 500. In a more specific configuration, the BMC 112 monitors the inventory and health-related aspects associated with the computer 500, such as, but not limited to, the temperature of one or more components of the computer 500, speed of rotational components (e.g., spindle motor, CPU fan, etc.) within the computer 500, the voltage across or applied to one or more components within the computer 500, and the available and/or used capacity of memory devices within the computer 500. To accomplish these monitoring functions, the BMC 112 is communicatively connected to one or more components by way of the system management bus 534 in some configurations.

In one configuration, these components include sensor devices 538 for measuring various operating and performance-related parameters within the computer 500. The sensor devices 538 can be either hardware or software based components configured or programmed to measure or detect one or more of the various operating and performance-related parameters.

The BMC 112 functions as the master on the system management bus 534 in most circumstances but can also function as either a master or a slave in other circumstances. Each of the various components communicatively connected to the BMC 112 by way of the system management bus 534 is addressed using a slave address. The system management bus 534 is used by the BMC 112 to request and/or receive various operating and performance-related parameters from one or more components, such as the firmware 107, which are also communicatively connected to the system management bus 534.

It should be appreciated that the functionality provided by the computer 500 can be provided by other types of computing devices, including hand-held computers, smartphones, gaming systems, set top boxes, tablet computers, embedded computer systems, personal digital assistants, and other types of computing devices known to those skilled in the art. It is also contemplated that the computer 500 might not include all the components shown in FIG. 5, can include other components that are not explicitly shown in FIG. 5, or might utilize an architecture completely different than that shown in FIG. 5.

Based on the foregoing, it should be appreciated that technologies for performing firmware attestation on system reset have been disclosed herein. Although the subject matter presented herein has been described in language specific to computer structural features, methodological acts, and computer readable media, it is to be understood that the present invention is not necessarily limited to the specific features, acts, or media described herein. Rather, the specific features, acts and mediums are disclosed as example forms.

The subject matter described above is provided by way of illustration only and should not be construed as limiting. Various modifications and changes can be made to the subject matter described herein without following the example configurations and applications illustrated and described, and without departing from the true spirit and scope of the present invention.

What is claimed is:

1. A computer-implemented method for a management system to monitor operations of a managed computing system, comprising:
   subscribing, by way of the management system, for notifications that the managed computing system has been reset, wherein:
      the notifications are generated by a baseboard management controller of the managed computing system; and
      the notifications are transmitted by the baseboard management controller to the management system by way of a first network that is utilized for control of the managed computing system, wherein the first network is an out-of-band network that enables the management system to control the managed computing system when the managed computing system is at least one of not reachable via the second network or powered off;
   receiving a notification that the managed computing system has been reset from the baseboard management controller at the management system and by way of the first network;
   responsive to receiving the notification that the managed computing system has been reset from the baseboard management controller, transmitting a request for firmware attestation data by way of a second network to a platform security agent executing on the managed computing system wherein the second network is utilized for production network traffic;
   receiving the firmware attestation data from the platform security agent by way of the second network; and
   exposing the firmware attestation data to one or more program components for use in evaluating a trustworthiness of a firmware executing on the managed computing system.

2. The computer-implemented method of claim 1, wherein a REDFISH-compatible event listener executing in the management system subscribes for the notifications that the managed computing system has been reset.

3. The computer-implemented method of claim 2, wherein the REDFISH-compatible event listener receives the notification that the managed computing system has been reset.

4. The computer-implemented method of claim 3, wherein the REDFISH-compatible event listener provides the notification that the managed computing system has been reset to a security manager executing in the management system.

5. The computer-implemented method of claim 4, wherein the security manager transmits the request for the firmware attestation data to a platform security agent executing on the managed computing system and receives the firmware attestation data from the platform security agent by way of the second network.

6. The computer-implemented method of claim 1, wherein an application programming interface server executes in the management system is configured to expose the firmware attestation data stored in a database to the one or more program components.

7. The computer-implemented method of claim 6, wherein the one or more program components comprise a management console and one or more orchestration systems.

8. At least one non-transitory computer-readable storage medium for a management system to monitor operations of a managed computing system, the least one non-transitory computer-readable storage medium having computer-executable instructions stored thereupon which, when executed by a computing system, cause the computing system to:
   subscribe, by way of the management system, for notifications that the managed computing system has been reset, wherein:
      the notifications are generated by a baseboard management controller of the managed computing system; and
      the notifications are transmitted by the baseboard management controller to the management system by way of a first network that is utilized for controlling the managed computing system, wherein the first network is an out-of-band network that enables the management system to control the managed computing system when the managed computing system is at least one of not reachable via the second network or powered off;
   receive a notification that the managed computing system has been reset from the baseboard management controller at the management system and by way of the first network;
   responsive to receiving the notification that the managed computing system has been reset from the baseboard management controller, transmit a request for firmware attestation data on a second network to a platform security agent executing on the managed computing system wherein the second network is utilized for production network traffic;
   receive the firmware attestation data from the platform security agent by way of the second network; and
   expose the firmware attestation data to one or more program components for use in evaluating a trustworthiness of a firmware executing on the managed computing system.

9. The non-transitory computer-readable storage medium of claim 8, wherein a REDFISH-compatible event listener executing in the management system subscribes for the notifications that the managed computing system has been reset.

10. The non-transitory computer-readable storage medium of claim 9, wherein the REDFISH-compatible event listener receives the notification that the managed computing system has been reset.

11. The non-transitory computer-readable storage medium of claim 10, wherein the REDFISH-compatible event listener provides the notification that the managed computing system has been reset to a security manager executing in the management system.

12. The non-transitory computer-readable storage medium of claim 11, wherein the security manager transmits the request for the firmware attestation data to a platform security agent executing on the managed computing system and receives the firmware attestation data from the platform security agent by way of the second network.

13. The non-transitory computer-readable storage medium of claim 12, wherein the security manager is further configured to store the firmware attestation data in a database.

14. The non-transitory computer-readable storage medium of claim 13, an application programming interface server executes in the management system is configured to expose the firmware attestation data stored in the database to the one or more program components.

15. The non-transitory computer-readable storage medium of claim 14, wherein the one or more program components comprise one or more of a management console or one or more orchestration systems.

16. A managed system for monitoring operations of a managed computing system, comprising:
   one or more processors; and
   at least one non-transitory computer-readable storage medium having computer-executable instructions stored thereupon which, when executed by the one or more processors, cause the computing system to:
   subscribe, by way of a REDFISH-compatible event listener, for notifications that the managed computing system has been reset, wherein:
      the notifications are generated by a baseboard management controller of the managed computing system; and
      the notifications are transmitted by the baseboard management controller to the management system by way of a first network that is utilized for control of the managed computing system;
   receive a notification at the REDFISH-compatible event listener that the managed computing system has been reset from the baseboard management controller by way of the first network;
   responsive to receiving the notification that the managed computing system has been reset from the baseboard management controller, transmit a request on a second network for firmware attestation data from a security manager to a platform security agent executing on the managed computing system wherein the second network is utilized for production network traffic, wherein the first network is an out-of-band network that enables the management system to control the managed computing system when the managed computing system is at least one of not reachable via the second network or powered off;
   receive the firmware attestation data at the security manager from the platform security agent on the second network; and expose the firmware attestation data to one or more program components for use in evaluating a trustworthiness of a firmware executing on the managed computing system.

17. The computing system of claim 16, wherein the security manager is further configured to store the firmware attestation data in a database.

18. The computing system of claim 17, wherein the at least one non-transitory computer-readable storage medium has further computer-executable instructions stored thereupon to cause an application programming interface server to expose the firmware attestation data stored in the database to the one or more program components.

19. The computing system of claim 18, wherein the one or more program components comprise one or more of a management console or one or more orchestration systems.

* * * * *